(12) United States Patent
Brancaleone et al.

(10) Patent No.: US 8,322,078 B2
(45) Date of Patent: Dec. 4, 2012

(54) INNER PANEL DESIGN FOR AUTOMOTIVE DOOR HEADER

(75) Inventors: Robert Anthony Brancaleone, Farmington Hills, MI (US); Tracy Christopher Bakos, Ann Arbor, MI (US); Todd William Dishman, Detroit, MI (US); James Joseph Franko, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 12/686,811

(22) Filed: Jan. 13, 2010

(65) Prior Publication Data

US 2011/0167732 A1    Jul. 14, 2011

(51) Int. Cl.
*B60J 5/04* (2006.01)

(52) U.S. Cl. .......................................... 49/502; 49/490.1

(58) Field of Classification Search .................... 49/502, 49/440, 441, 498.1, 490.1, 475.1; 296/146.1, 296/146.2, 146.3, 146.5
See application file for complete search history.

(56) References Cited

U.S. PATENT DOCUMENTS

| | | | | |
|---|---|---|---|---|
| 4,956,943 A * | 9/1990 | Yamada et al. | | 49/503 |
| 4,969,295 A * | 11/1990 | Nishikawa et al. | | 49/502 |
| 5,107,624 A * | 4/1992 | Passone | | 49/502 |
| 5,367,831 A * | 11/1994 | Gunkel | | 49/478.1 |
| 6,073,991 A | 6/2000 | Naert | | |
| 6,634,698 B2 | 10/2003 | Kleino | | |
| 6,641,204 B2 | 11/2003 | Ogawa et al. | | |
| 6,668,490 B2 * | 12/2003 | Hock et al. | | 49/502 |
| 6,732,474 B1 * | 5/2004 | Eck et al. | | 49/502 |
| 6,779,830 B2 | 8/2004 | Patberg et al. | | |
| 6,811,194 B1 * | 11/2004 | Gaertner et al. | | 296/1.08 |
| 6,928,735 B2 * | 8/2005 | Malik et al. | | 29/897.2 |
| 6,942,281 B2 | 9/2005 | Omori et al. | | |
| 7,086,201 B2 * | 8/2006 | Struyven et al. | | 49/502 |
| 7,093,393 B2 * | 8/2006 | Hock et al. | | 49/502 |
| 7,125,067 B2 | 10/2006 | Bonnett et al. | | |
| 7,325,859 B1 | 2/2008 | Brancaleone et al. | | |
| 2003/0177702 A1 * | 9/2003 | Hock et al. | | 49/502 |
| 2004/0123526 A1 * | 7/2004 | Hock et al. | | 49/502 |
| 2004/0216386 A1 * | 11/2004 | Chernoff et al. | | 49/502 |
| 2004/0216387 A1 * | 11/2004 | Furuse | | 49/502 |
| 2004/0244298 A1 * | 12/2004 | Ogawa et al. | | 49/502 |
| 2005/0001448 A1 | 1/2005 | Omori et al. | | |

(Continued)

FOREIGN PATENT DOCUMENTS

DE    3625069 A1 * 12/1987

OTHER PUBLICATIONS

Barry L. Mordike et al., "Magnesium alloys and their applications," Google books, 1998, Volkswagenwerk, http://books.google.com/books?id=cd3TYjzMAugC&pg=PA482&lpg=PA482&dq=Magnesium+inner+door+panel&source=bl&ots=VK8B3kDTPA&sig=nP_90DjP9upBYRKD2Lpo4OTtfsw&hl=en&ei=xWjDSbrMONSfkQWM183DDA&sa=X&oi=book_result&resnum=5&ct=result.

(Continued)

*Primary Examiner* — Jerry Redman
(74) *Attorney, Agent, or Firm* — James J. Dottavio; Price Heneveld LLP

(57) ABSTRACT

A door for a vehicle including a cast upper door frame having an upper halo portion including a central web. A glass run flange is connected to the central web by an intermediate connector. A door flange extends from the central web substantially orthogonally thereto. A stamped aluminum lower inner panel is operably connected to the cast upper frame.

18 Claims, 5 Drawing Sheets

U.S. PATENT DOCUMENTS

| | | | |
|---|---|---|---|
| 2005/0166462 A1* | 8/2005 | Losch et al. | 49/502 |
| 2006/0064938 A1* | 3/2006 | Unterreiner et al. | 49/502 |
| 2006/0156632 A1* | 7/2006 | Ruppert et al. | 49/502 |
| 2007/0137112 A1* | 6/2007 | Furuzawa et al. | 49/489.1 |
| 2007/0262607 A1* | 11/2007 | Saito | 296/146.2 |
| 2007/0296250 A1* | 12/2007 | Yatsuda et al. | 296/201 |
| 2008/0030046 A1* | 2/2008 | Krause | 296/146.2 |
| 2008/0092453 A1 | 4/2008 | Fuetterer | |
| 2008/0127569 A1* | 6/2008 | Boddy et al. | 49/502 |
| 2009/0015035 A1 | 1/2009 | Baumgart et al. | |
| 2009/0165392 A1* | 7/2009 | Totani et al. | 49/502 |
| 2010/0181798 A1* | 7/2010 | Takeuchi et al. | 296/146.5 |
| 2011/0011005 A1* | 1/2011 | Halliwell et al. | 49/502 |

OTHER PUBLICATIONS

Charles A. Harper, "Handbook of Plastics, Elastomers, and Composite," Google books, 2002, http://books.google.com/books?id=e8-FSos9PAkC&pg=PA602&lpg=PA602&dq=Magnesium+inner+door+panel&source=bl&ots=xvpot5o9AQ&sig=VQgF8A1g0llTblzoYOrQ2ockF1Q&hl=en&ei=xWjDSbrMONSfkQWM183DDA&sa=X&oi=book_result&resnum=8&ct=result.

* cited by examiner

US 8,322,078 B2

INNER PANEL DESIGN FOR AUTOMOTIVE DOOR HEADER

FIELD OF THE INVENTION

The present invention generally concerns an inner panel design for an automotive door header, and more particularly relates to a lightweight design incorporating a cast upper door frame and stamped lower panel.

BACKGROUND OF THE PRESENT INVENTION

Panel designs for automotive doors are generally constructed to be fairly rigid and robust so that the doors can withstand side collisions. Constructions of this type can lead to heavy and bulky door construction.

SUMMARY OF THE PRESENT INVENTION

One aspect of the present invention includes a door for a vehicle including a cast upper door frame having an upper halo portion including a central web. A glass run flange is connected to the central web by an intermediate connector. A door flange extends from the central web substantially orthogonally thereto. A stamped aluminum lower inner panel is operably connected to the cast upper door frame.

Another aspect of the present invention includes a door for a vehicle having a single integral door frame including an upper halo portion having a central web. A glass run flange is connected to the central web by an intermediate connector. A door flange extends from the central web substantially orthogonally thereto. A stamped lower inner panel is operably connected to the cast upper door frame. A stamped lower outer panel is operably connected to the lower inner panel.

Yet another aspect of the present invention includes a method for making a vehicle door including casting an upper door frame with an upper halo portion. A central web is formed in the upper halo portion. The central web is connected with an intermediate connector. A glass run flange extends from the intermediate connector. A door flange extends from the central web. An aluminum lower inner panel is stamped to the cast upper door frame. The lower inner panel is connected to the cast upper door frame.

These and other aspects, objects, and features of the present invention will be understood and appreciated by those skilled in the art upon studying the following specification, claims, and appended drawings.

DETAILED DESCRIPTION OF EMBODIMENTS

Figure 1:
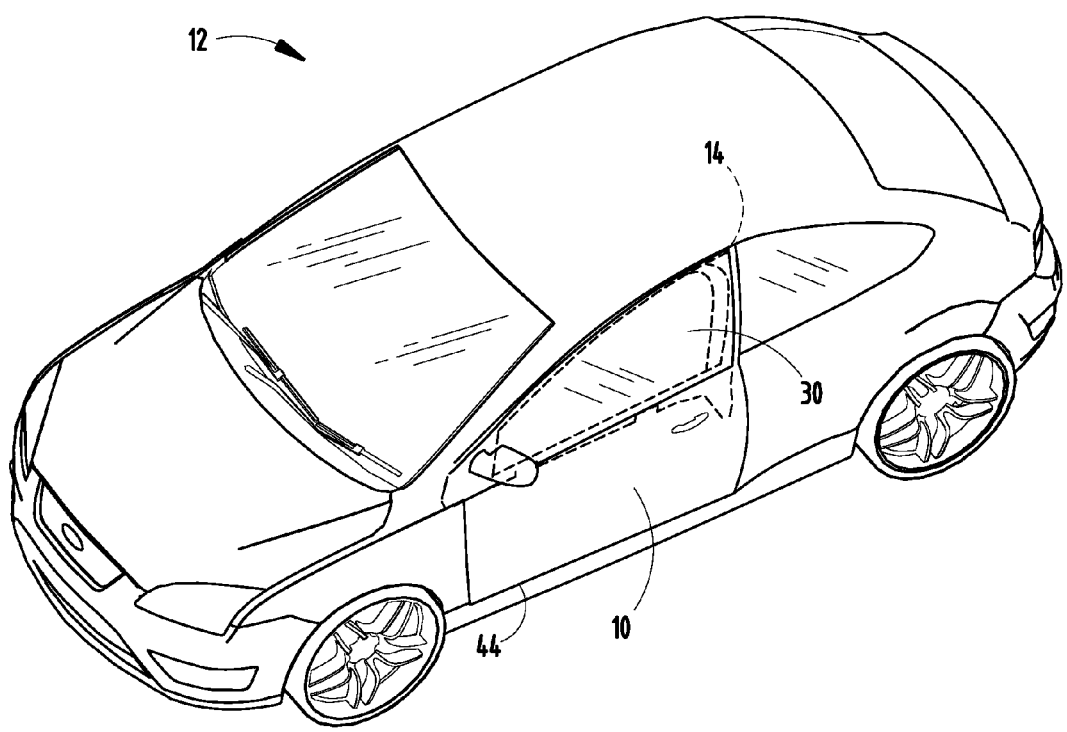
FIG. 1 is a top perspective view of one embodiment of a vehicle incorporating an inner panel design of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
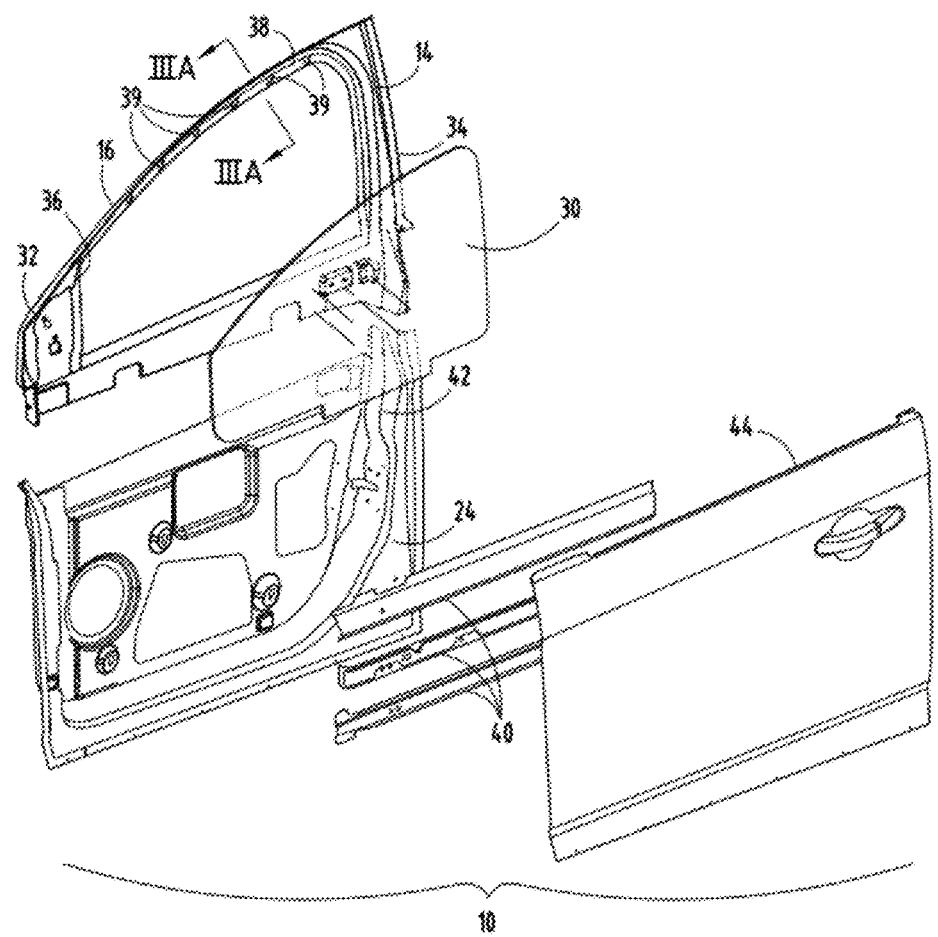
FIG. 2 is a top perspective exploded view of the vehicle door shown in FIG. 1.

Referring to FIGS. 1-3, the reference numeral 10 generally designates a door for a vehicle 12 including a cast upper door frame 14 having an upper halo portion 16 including a central web 18. A glass run flange 20 is connected to the central web 18 by an intermediate connector 19. A door flange 22 extends from the central web 18 substantially orthogonally thereto. A stamped aluminum lower inner panel 24 is operably connected to the cast upper door frame 14.

Figure 4A:
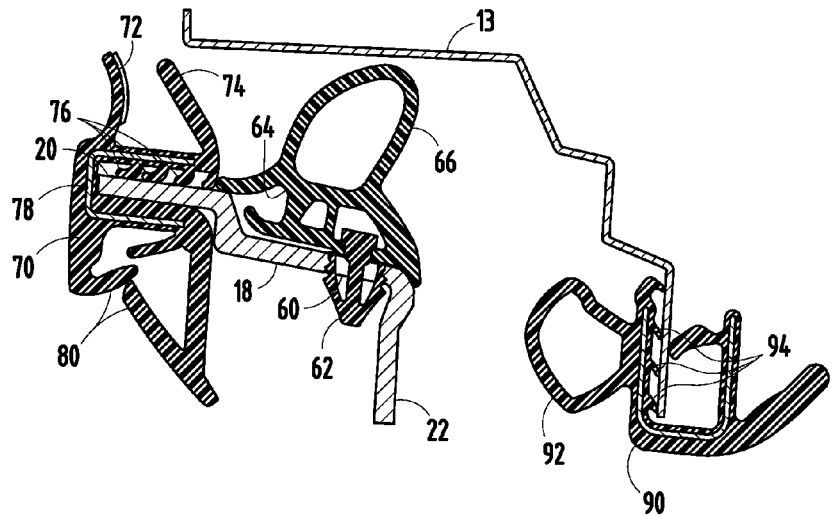
FIG. 4A is a side elevational cross-sectional view of the upper halo portion of the door frame prior to closing of the door.

Referring again to FIGS. 1 and 2, the door 10 for the vehicle 12 may be a driver's side or passenger's side door or could alternatively be used as a rear passenger door (not shown). The door 10 is hingedly connected to the vehicle 12 and seals against a door opening 13 (FIG. 4A). The upper door frame 14 of the door 10 is cast and has a halo type configuration that encircles a pane of glass 30 in the door 10. The upper door frame 14 includes a forward halo portion 32 and a rearward halo portion 34 that are fixedly connected with forward and rearward ends 36, 38, respectively, of the upper halo portion 16. Web supports 39 are intermittently spaced along the upper halo portion 16. The upper door frame or halo 14 is fixedly connected, by mechanical fasteners or welding for example, with the lower inner panel 24. Structural support beams 40 extend across the lower inner panel 24 laterally and add rigidity as well as strength to the door 10 in the event of a collision. The structural support beams 40 are sandwiched between an inner door panel 42 and an outer door panel 44. The outer door panel 44 is connected to the inner door panel 42 by mechanical fasteners.

Figure 3A:
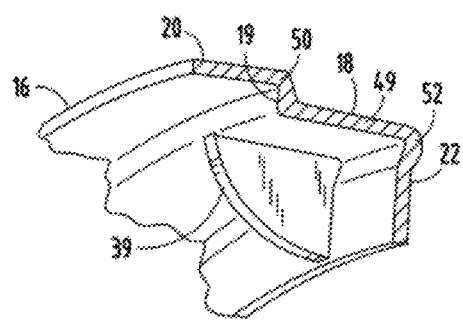
FIG. 3A is a top perspective view of an upper halo portion of an upper door frame.

Referring to the illustrated embodiment of FIG. 3A, a first end 49 of the central web 18 of the upper halo portion 16 of the cast upper door frame 14 is connected to the glass run flange 20 by the intermediate connector 19. The intermediate connector 19 acts as a link or transition area between the central web 18 and the glass run flange 20. The intermediate connector 19 may include a thickened portion 50 to provide additional strength and rigidity to the upper halo portion 16. The planar extent of the central web 18 and the planar extent of the glass run flange 20 are offset but substantially parallel to one another. It is contemplated that the planar extent of the central web 18 and the planar extent of the glass run flange 20 may be angled slightly toward or away from one another. The intermediate connector 19 extends substantially orthogonal to both the glass run flange 20 and the intermediate connector 19. However, it is contemplated that the intermediate connector 19 may be angled slightly between the central web 18 and the glass run flange 20. The intermittently spaced web supports 39 extend between a distal end of the door flange 22 and the intermediate connector 19. Accordingly, the intermittently spaced web supports 39 extend adjacent to the central web 18 and extend orthogonally from the central web 18.

Figure 3B:
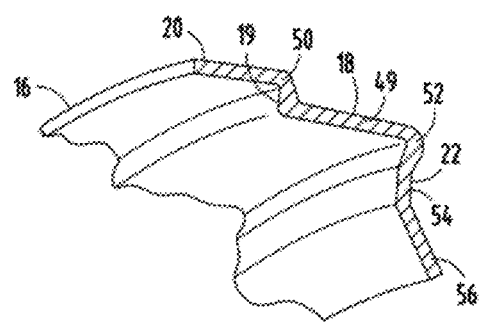
FIG. 3B is a top perspective view of another embodiment of an upper halo portion of an upper door frame.

Referring now to the embodiments illustrated in FIGS. 3A and 3B, a second end 52 of the central web 18 connects with the door flange 22. The door flange 22 includes a first part 54 that extends orthogonal to the central web 18 and a second part 56 that extends at an angle from the first part 54 as shown in FIG. 3B. Alternatively, the door flange 22 can also extend in a linear fashion from the second end 52 of the central web 18 (FIG. 3A). The entire upper door frame 14 is cast as a single integral unit, which allows for a lightweight upper door frame 14 without compromising structural rigidity and strength. In one embodiment, the upper door frame 14 is cast from magnesium, although other possible constructions are also contemplated.

Figure 4B:
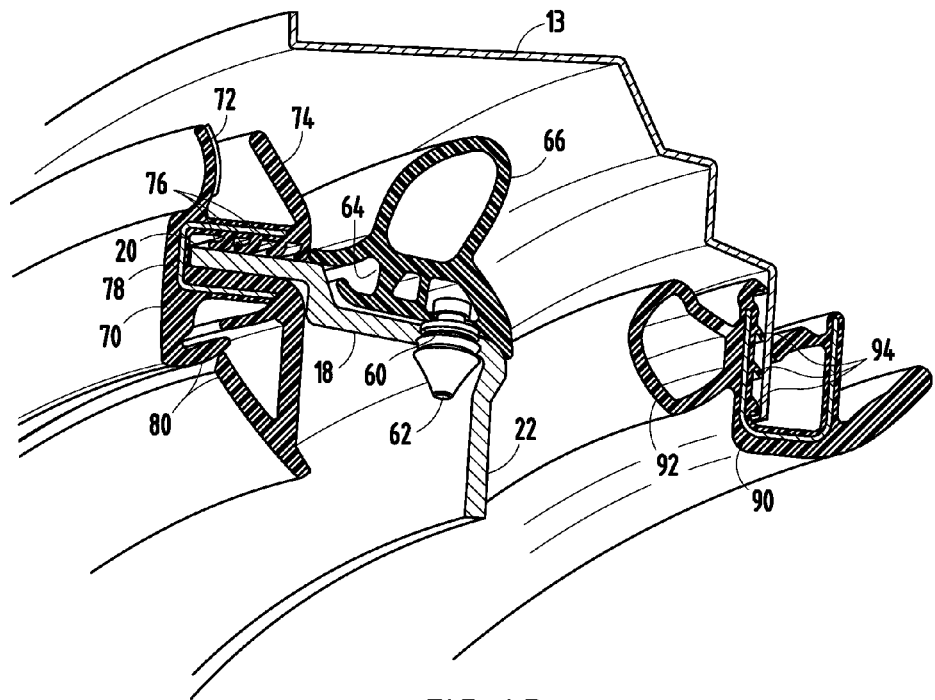
FIG. 4B is a bottom perspective view of the upper halo portion of FIG. 4A.

Referring now to the illustrated embodiments of FIGS. 4A and 4B, the central web 18 includes a plurality of apertures 60 designed to receive a connector 62 disposed on a body seal 64. The body seal 64 includes a tubular engagement portion 66 that engages the door opening 13 and seals the upper door frame 14 against the door opening 13 of the vehicle 12. A glass run seal 70 is connected to the glass run flange 20 and is designed for releasably receiving a window that can removably extend into the glass run seal 70, as discussed in further detail below. The glass run seal 70 includes first and second vertical pliable flanges 72, 74 that rest against the door opening 13 when the door 10 is closed. A plurality of ribs 76 frictionally engage the glass run flange 20 and hold the glass run seal 70 in place on the glass run flange 20. A U-shaped support 78 may be presented to provide rigidity to the glass run seal 70. A bottom portion of the glass run seal 70 includes sealing engagement members 80 that frictionally engage the window 30 when the window 30 is in the raised closed position.

Referring again to FIGS. 4A and 4B, a door seal 90 is connected with the door opening 13 and abuts the door flange 22. The door seal 90 includes a tubular engagement member 92 that frictionally engages the door flange 22 when the door 10 is closed. A plurality of ribs 94 engage the metal door opening 13 to keep the door seal 90 in place.

Figure 5A:
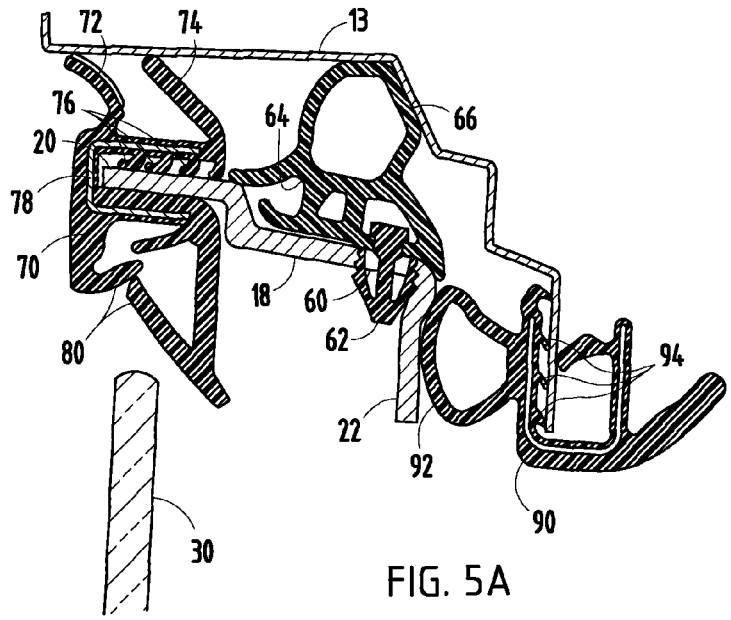
FIG. 5A is a side elevational cross-sectional view of the upper halo portion engaged with the door opening 13 when the door is closed and the window is open.
Figure 5B:
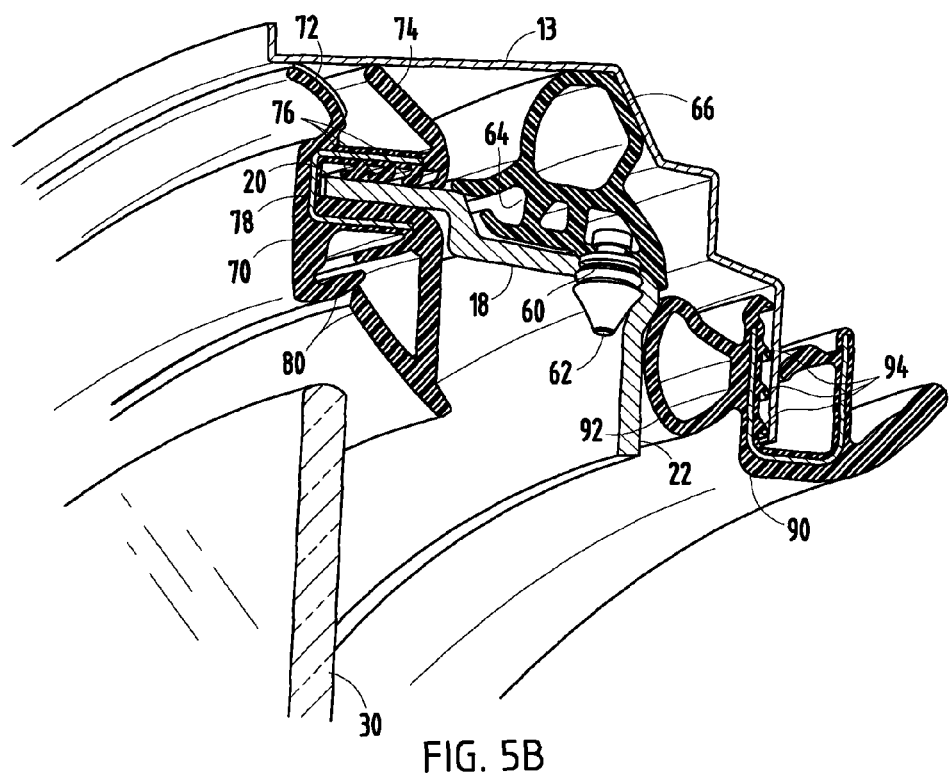
FIG. 5B is a bottom perspective view of the upper halo portion and door opening of FIG. 5A.

Referring now to FIGS. 5A and 5B, when the door is closed, the tubular engagement portion 66 of the body seal 64 abuts an abutment area on the door opening 13, creating a substantially airtight seal. At the same time, the tubular engagement 92 of the door seal 90 engages the door flange 22 to create a second substantially airtight seal. The first and second vertical pliable flanges 72, 74 also engage the door opening 13 at a laterally extending member, providing a third substantially airtight seal between the door 10 and the door opening 13. As indicated above, the window 30 is vertically operable between raised and lowered positions and is shown in the lower position in FIGS. 5A and 5B.

Figure 6A:
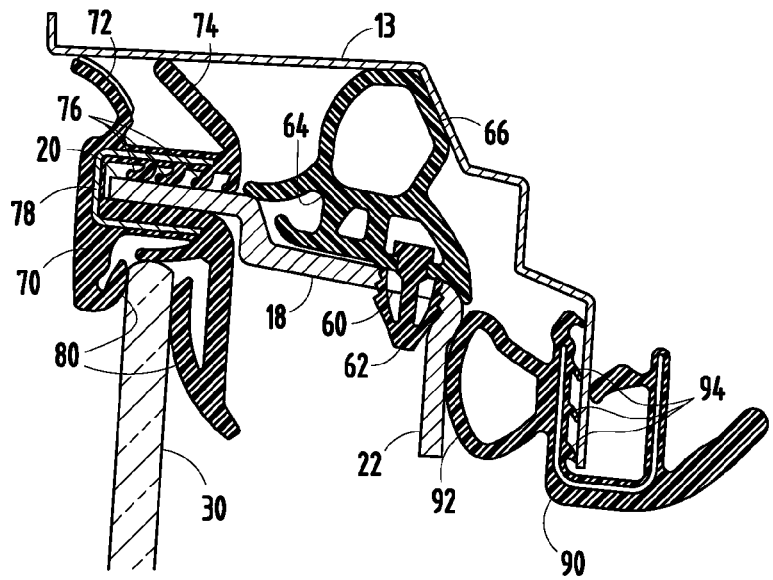
FIG. 6A is a side elevational cross-sectional view of the upper halo portion closed against the door opening with the window closed.
Figure 6B:
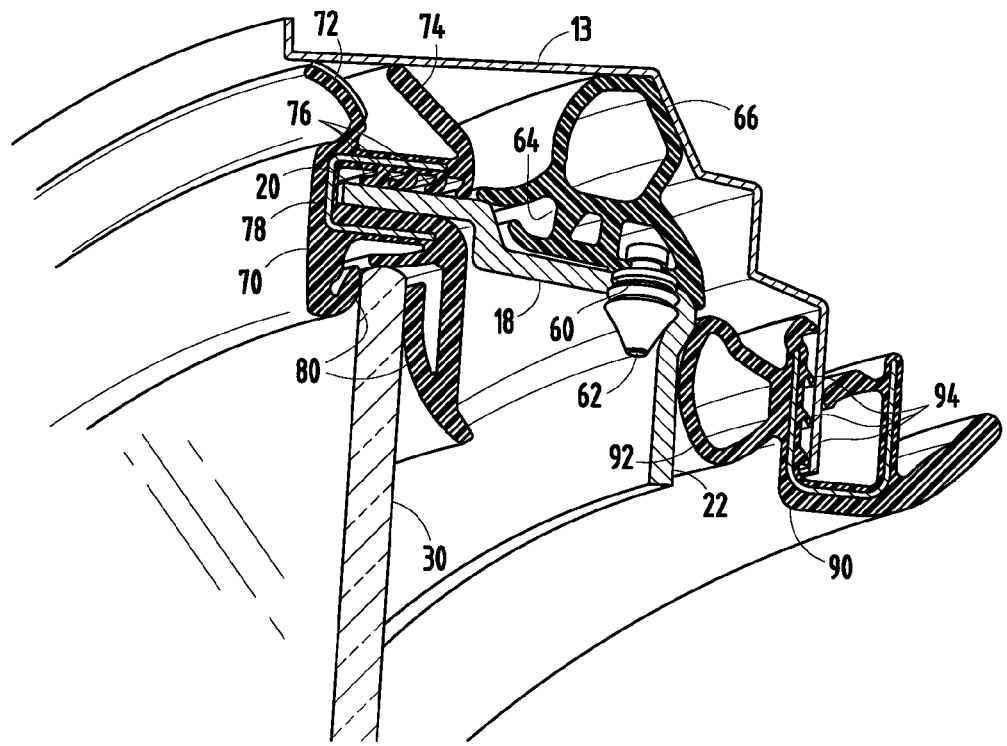
FIG. 6B is a bottom perspective view of the upper halo portion and door opening of FIG. 6A.

Referring now to FIGS. 6A and 6B, when the window 30 is elevated to the raised position, the sealing engagement members 80 frictionally engage with the window 30 to minimize air infiltration into the interior of the vehicle 12. It is conceived that the sealing engagement members 80 are made of a pliable material that flexes against the window 30.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door for a vehicle comprising:
   a cast upper door frame having an upper halo portion comprising:
      a central web having a body seal abutting the vehicle;
      a glass run flange connected to the central web by an intermediate connector; and
      a door flange extending substantially orthogonally from the central web and abutting a door seal coupled to the vehicle; and
   a stamped aluminum lower inner panel operably connected to the cast upper door frame.

2. The door for a vehicle of claim 1, wherein the cast upper door frame is made of cast magnesium or aluminum.

3. The door for a vehicle of claim 1, wherein a planar extent of the central web and the glass run flange are substantially parallel, and wherein the intermediate connector is substantially orthogonal to both the glass run flange and the central web.

4. The door for a vehicle of claim 1, further comprising:
   intermittently spaced web supports that extend adjacent to the central web.

5. The door for a vehicle of claim 4, wherein the intermittently spaced web supports extend between a distal end of the door flange and the intermediate connector.

6. The door for a vehicle of claim 1, wherein the body seal includes a tubular engagement portion that engages a door opening of the vehicle.

7. The door for a vehicle of claim 1, further comprising:
   a stamped aluminum lower outer panel.

8. The door for a vehicle of claim 1, wherein the door flange and the central web are connected by a thickened transition portion.

9. The door for a vehicle of claim 1, wherein the door seal includes a tubular engagement member that frictionally engages the door flange when the door is closed.

10. The door for a vehicle of claim 1, further comprising:
    a glass run seal operably engaged with the glass run flange.

11. A door for a vehicle comprising:
    an upper door frame cast from magnesium and having an upper halo portion having a solid cross-section and comprising:
       a central web;
       a glass run flange connected to the central web by an intermediate connector; and
       a door flange extending from the central web substantially orthogonally thereto; and
    a stamped lower inner panel operably connected to the upper door frame.

12. The door for a vehicle of claim 11, further comprising:
    a stamped lower outer panel operably connected to the lower inner panel, and wherein the upper halo portion is cast from magnesium or aluminum.

13. The door for a vehicle of claim 11, wherein a planar extent of the central web and the glass run flange are substantially parallel, and wherein the intermediate connector is substantially orthogonal to both the glass run flange and the central web.

14. The door for a vehicle of claim 11, further comprising:
    intermittently spaced web supports that extend orthogonally from the central web.

15. The door for a vehicle of claim 14, wherein the intermittently spaced web supports extend between a distal end of the door flange and the intermediate connector.

16. The door for a vehicle of claim 11, further comprising: a body seal operably connected with the central web.

17. The door for a vehicle of claim 11, wherein the door flange and the central web are connected by a thickened transition portion.

18. The door for a vehicle of claim 11, further comprising: a door seal in abutting contact with the door flange.

* * * * *